Aug. 11, 1931.  F. NETZ  1,818,813
CHAIN HOOK
Filed June 11, 1930
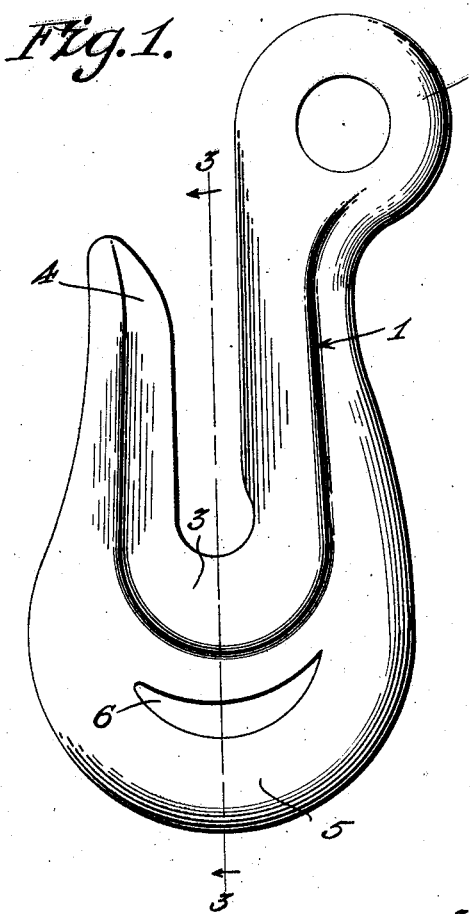
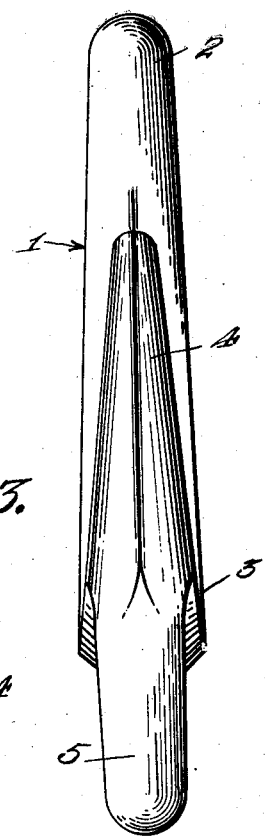
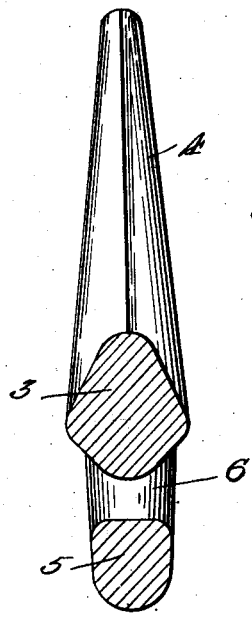
Fritz Netz, INVENTOR
BY Victor J. Evans
ATTORNE Patented Aug. 11, 1931

1,818,813

UNITED STATES PATENT OFFICE

FRITZ NETZ, OF ODELL, NEBRASKA

CHAIN HOOK

Application filed June 11, 1930. Serial No. 460,483.

This invention relates to a chain hook and more particularly to a hook for application to the end of the hoisting and other like chains. It is well known that hooks of this class are subjected to severe strains and considerable wear, and therefore it is the primary object of the present invention to provide a hook of this class having a reinforcement integral with and extending along the outer side of the bow of the hook, this being the portion of the hook which is subjected to the greatest strain.

Another object of the invention is to provide a hook of the type referred to, reinforced in such a manner that the reinforcement will not cause any abrasion or other damage to a part engaged by the hook.

This invention also consists in certain other features of construction and in the combination and arrangement of the several parts, to be hereinafter fully described, illustrated in the accompanying drawings, and specifically pointed out in the appended claim, it being understood of course that minor changes may be made so long as they fall within the scope of the claim.

In describing my invention in detail, reference will be had to the accompanying drawings, wherein like characters denote like or corresponding parts throughout the several views, and in which:

Figure 1 is a view in side elevation of the hook embodying the invention.

Figure 2 is a view looking at the forward side of the hook.

Figure 3 is a vertical sectional view taken substantially on the line 3—3 of Figure 1, looking in the direction indicated by the arrows.

The hook embodying the invention comprises a shank 1 which is formed at its upper end with the usual eye 2 with which a terminal link of a chain may be engaged or, if desired, a cable may be engaged through this eye. The hook comprises the usual bow 3 and bill 4, and the invention resides in the provision of a reinforcement 5 which is cast or otherwise formed integral with the outer sides of the shank 1, bow 3 and bill 4. This reinforcement is transversely rounded as will be observed by reference to Figures 2 and 3 of the drawings, and therefore offers no sharp corners or angles to mar parts with which the hook is engaged. In order that the weight of the hook may be somewhat lightened, due to the provision of the reinforcement, a crescent shaped slot 6 is preferably formed in the reinforcement at that portion thereof which extends about the outer or under side of the bow of the hook.

What I claim is:

A chain hook including a shank integrally connected with a bill portion by a bow portion and said portions and shank formed of comparatively thin material, a reinforcing portion transversely rounded formed integral with the outer sides of said portions and shank and tapering toward the free end of the bill portion to permit the bill portion to be easily inserted in a chain link, said reinforcing portion having a slot adjacent the bow portion to reduce the weight of the device.

In testimony whereof I affix my signature.

FRITZ NETZ.